US 8,572,597 B2

(12) United States Patent
Herle

(10) Patent No.: US 8,572,597 B2
(45) Date of Patent: Oct. 29, 2013

(54) APPARATUS AND METHOD FOR PERFORMING AN OVER-THE-AIR SOFTWARE UPDATE IN A DUAL PROCESSOR MOBILE STATION

(75) Inventor: Sudhindra P. Herle, Plano, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 2222 days.

(21) Appl. No.: 10/600,223

(22) Filed: Jun. 20, 2003

(65) Prior Publication Data

US 2004/0261072 A1    Dec. 23, 2004

(51) Int. Cl.
G06F 9/44    (2006.01)

(52) U.S. Cl.
USPC ............ 717/168; 717/170; 717/172; 717/175

(58) Field of Classification Search
USPC ........................... 717/168–178; 455/418–420
See application file for complete search history.

(56) References Cited

U.S. PATENT DOCUMENTS

| | | | |
|---|---|---|---|
| 6,279,153 B1 * | 8/2001 | Bi et al. | 717/171 |
| 6,640,334 B1 * | 10/2003 | Rasmussen | 717/171 |
| 6,918,108 B2 * | 7/2005 | Rajaram | 717/126 |
| 7,117,494 B2 * | 10/2006 | Rajaram | 717/174 |
| 7,231,531 B2 * | 6/2007 | Cupps et al. | 713/322 |
| 2003/0023964 A1 * | 1/2003 | Rajaram et al. | 717/172 |
| 2003/0154471 A1 * | 8/2003 | Teachman et al. | 717/171 |
| 2003/0182414 A1 * | 9/2003 | O'Neill | 709/223 |
| 2004/0068721 A1 * | 4/2004 | O'Neill et al. | 717/168 |
| 2004/0098715 A1 * | 5/2004 | Aghera et al. | 717/173 |
| 2005/0120346 A1 * | 6/2005 | Sprigg | 717/176 |
| 2005/0204353 A1 * | 9/2005 | Ji | 717/168 |
| 2005/0215248 A1 * | 9/2005 | Brookshire | 455/426.1 |
| 2006/0195840 A1 * | 8/2006 | Sundarrajan et al. | 717/176 |
| 2006/0258291 A1 * | 11/2006 | Nakata et al. | 455/67.11 |
| 2007/0015499 A1 * | 1/2007 | Vikse et al. | 455/419 |
| 2007/0142083 A1 * | 6/2007 | Cupps et al. | 455/556.1 |
| 2008/0020753 A1 * | 1/2008 | Glass et al. | 455/425 |

OTHER PUBLICATIONS

Srikanteswara et al., Design and implementation of a completely reconfigurable soft radio, IEEE, Sep. 2000 pp. 7-11.*
Forsberg et al., Distributing mobility agents hierarchically under frequent location updates, IEEE, Nov. 1999 pp. 159-168.*
Mihaljevic et al., On a framework for employment of cryptographic components in software defined radio, IEEE, Oct. 2002 pp. 835-839 vol. 2.*
Lange, Danny B. "Mobile objects and mobile agents: the future of distributed computing?." ECOOP'98—Object-Oriented Programming. Springer Berlin Heidelberg, 1998, pp. 1-12.*
Lorenzo Bettini et al., Software update via mobile agent based programming, Proceeding SAC '02 Proceedings of the 2002 ACM symposium on Applied computing, pp. 32-36.*
Angin, Oguz, et al. "The Mobiware toolkit: Programmable support for adaptive mobile networking." Personal Communications, IEEE 5.4 (1998), pp. 32-43.*

* cited by examiner

*Primary Examiner* — Wei Zhen
*Assistant Examiner* — Satish Rampuria

(57) ABSTRACT

A wireless communication device for accessing a wireless network and downloading a software upgrade file. The wireless communication device comprises: i) a CPU for controlling wireless communications with the wireless network; ii) a first memory associated with the first CPU; iii) a CPU for executing at least one end-user application on the wireless communication device; and iv) a second memory associated with the second CPU. The first CPU downloads the software upgrade file from the wireless network and stores the downloaded software upgrade file in the second memory for subsequent execution. The first CPU and the second CPU share resources in order to carry out software upgrades for either or both CPUs.

24 Claims, 4 Drawing Sheets

APPARATUS AND METHOD FOR PERFORMING AN OVER-THE-AIR SOFTWARE UPDATE IN A DUAL PROCESSOR MOBILE STATION

TECHNICAL FIELD OF THE INVENTION

The present invention is directed generally to wireless communication systems and, more specifically, to an apparatus and method for upgrading the software in a dual processor wireless communication device.

BACKGROUND OF THE INVENTION

In order to increase the wireless market to the greatest extent possible, wireless service providers and wireless equipment manufacturers constantly seek new ways to make wireless equipment and services as convenient, user-friendly, and affordable as possible. To that end, wireless service providers and the manufacturers of wireless mobile stations, such as cell phones, and fixed (or stationary) wireless terminals, frequently work together to streamline procedures for enrolling and equipping new subscribers and for improving the services and equipment of existing subscribers.

One important aspect of these efforts involves over-the-air (OTA) provisioning and upgrading of wireless mobile stations, such as cell phones, wireless personal digital assistants (PDAs), wireless hand-held computers, two-way pagers, and the like, as well as fixed wireless terminals. OTA provisioning is a relatively new feature that enables a new subscriber who purchases a new cell phone (or other wireless device) to set up a new account with a wireless service provider and to configure the new cell phone for operation. The OTA provisioning procedure is mostly automated and often does not require the new subscriber to visit a cell phone service center. Typically, the new subscriber removes the new cell phone from its box, calls a special purpose telephone number (given in the instructions), and performs an interactive provisioning procedure with an automated agent or a human service representative.

The over-the-air (OTA) upgrading of a wireless device also is a relatively new procedure that enables a subscriber to download and install upgraded software containing patches, bug fixes, and newer versions of the software, including the operating system, stored in the wireless device. The wireless service provider or the mobile station manufacturer, or both, may provide the upgraded software.

It has long been possible to download and to install software upgrades for a personal computer (PC) via the Internet. However, this process is considerably more complicated in a mobile station. A personal computer has far more resources available to perform a software upgrade, including dynamically linked libraries (DLLs), a memory management unit (MMU), and a large random access memory (RAM) space. A conventional PC software upgrade may be partitioned and downloaded to a personal computer as a group of shared objects.

In contrast, a wireless mobile station (e.g., a cell phone) typically has far fewer resources available than a PC. Mobile stations lack a memory management unit and code is not executed from RAM. Code is executed out of a Flash memory (or other non-volatile (NV) memory) that acts as a read-only memory (ROM). The Flash memory generally cannot be written to, it can only be re-programmed with great difficulty. These resource limitations greatly complicate OTA software upgrade operations in wireless mobile stations.

Additionally, OTA software upgrade procedures became more complicated with the appearance in the cellular market of cell phones containing two central processing units. For example, Samsung® is delivering dual central processing unit (CPU) phones in Korea. In a dual CPU mobile station, a main (or primary) CPU executes the radio frequency (RF) communication functions and call processing operations of the mobile station. The main CPU also may be referred to as the modem CPU. A slave (or secondary) CPU executes user interface (UI) functions and end-user applications on the wireless mobile station. These user applications may include a word processing application, a calendar application, a video game, an e-mail application, and the like. The slave CPU may also be referred to as the multimedia CPU. In this manner, the software that runs on a conventional wireless communication device is split into two parts in a dual CPU mobile station. Currently, there is no OTA upgrade procedure that addresses the upgrading problems that are peculiar to a dual CPU wireless communication device.

Therefore, there is a need in the art for improved systems and methods for performing automatic software upgrades of wireless mobile stations and fixed wireless terminals that incorporate a dual CPU architecture.

SUMMARY OF THE INVENTION

To address the above-discussed deficiencies of the prior art, it is a primary object of the present invention to provide a wireless communication device capable of accessing a wireless network and downloading a software upgrade file therefrom. According to an advantageous embodiment of the present invention, the wireless communication device comprises: i) a first central processing unit (CPU) capable of controlling wireless communications with the wireless network; ii) a first memory associated with the first CPU; iii) a second central processing unit (CPU) capable of executing at least one end-user application on the wireless communication device; and iv) a second memory associated with the second CPU, wherein the first CPU downloads the software upgrade file from the wireless network and stores the downloaded software upgrade file in the second memory.

According to one embodiment of the present invention, the first CPU is capable of executing a first upgrade agent program that replaces first existing code associated with a first existing software file in the first memory with first replacement code from the downloaded software upgrade file.

According to another embodiment of the present invention, the first upgrade agent program is stored in the first memory.

According to still another embodiment of the present invention, the downloaded software upgrade file is transferred from the second memory to the first memory by an interprocessor communication unit.

According to yet another embodiment of the present invention, the first CPU executes the first upgrade agent program after the downloaded software upgrade file is transferred into the first memory from the second memory.

According to a further embodiment of the present invention, the first upgrade agent program is transferred from the second memory and stored in the first memory.

According to a still further embodiment of the present invention, the second CPU is capable of executing a second upgrade agent program that replaces second existing code associated with a second existing software file in the second memory with second replacement code from the downloaded software upgrade file.

According to a yet further embodiment of the present invention, the second upgrade agent program is stored in the second memory.

In one embodiment of the present invention, the second upgrade agent program is transferred from the first memory and stored in the second memory.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless communication device.

Figure 1:
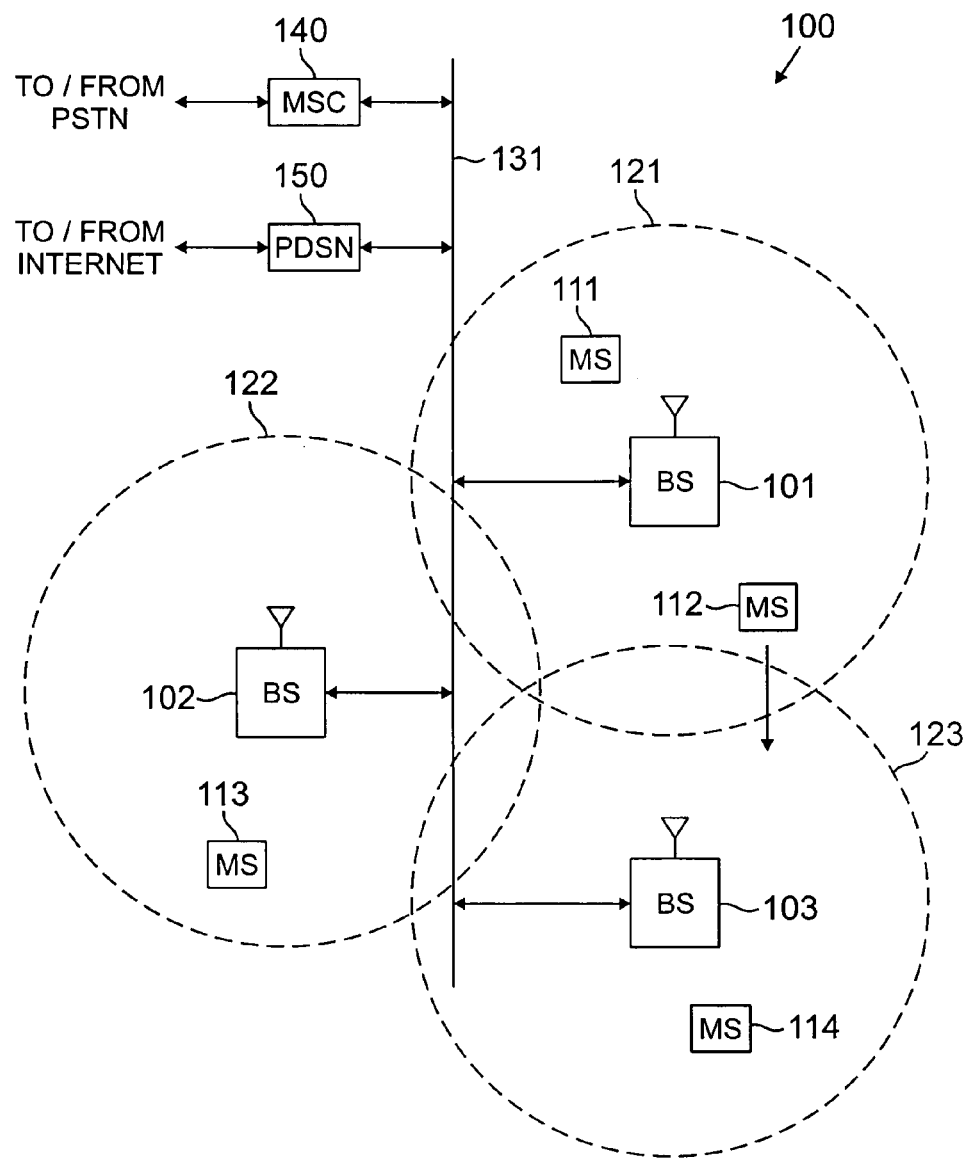
FIG. 1 illustrates an exemplary wireless network according to one embodiment of the present invention.

FIG. 1 illustrates exemplary wireless network 100 according to one embodiment of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over code division multiple access (CDMA) channels. Mobile stations 111-114 may be any suitable wireless devices, including conventional cellular radiotelephones, PCS handset devices, personal digital assistants, portable computers, or metering devices.

However, it should be understood that the present invention is not limited to mobile devices. Other types of access terminals may be used, including fixed (i.e., stationary) wireless terminals. For the sake of simplicity, only mobile stations are shown and discussed hereafter. However, for the purposes of defining the scope of the claims of the present invention, the terms "mobile station," "wireless communication device," "wireless terminal," and any other term used to denote a device that wirelessly communicates with a base station, should be construed broadly to include both mobile and stationary wireless access devices.

Dotted lines show the approximate boundaries of the cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, each one of cell sites 121-123 comprises a plurality of sectors (not shown), each sector being illuminated by a directional antenna coupled to the base station. The embodiment of FIG. 1 illustrates the base station in the center of the cell. Alternate embodiments position the directional antennas in corners of the sectors. The present invention is not limited to any particular cell site configuration.

In one embodiment of the present invention, each one of BS 101, BS 102, and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem (BTS) comprises the RF transceivers, antennas, and other electrical equipment located in each cell site. This equipment may include air conditioning units, heating units, electrical power supplies, telephone line interfaces, and RF transmitters and RF receivers. For the purpose of simplicity and clarity in explaining the operation of the present invention, the base transceiver subsystem(s) in each of cells 121, 122, and 123 and the base station controller (BSC) associated with each base transceiver subsystem (BTS) are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center MSC) 140. BS 101, BS 102 and BS 103 also transfer data signals, such as packet data, with the Internet (not shown) via communication line 131 and packet data server node (PDSN) 150. Line 131 also provides the connection path to transfers control signals between MSC 140 and BS 101, BS 102 and BS 103 used to establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. Those skilled in the art will recognize that the connections on line 131 may provide a transmission path for transmission of analog voice band signals, a digital path for transmission of voice signals in the pulse code modulated (PCM) format, a digital path for transmission of voice signals in an Internet Protocol (IP) format, a digital path for transmission of voice signals in an asynchronous transfer mode (ATM) format, or other suitable connection transmission protocol. Those skilled in the art will recognize that the connections on line 131 may provide a transmission path for transmission of analog or digital control signals in a suitable signaling protocol.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

As is well known, the hand-off procedure transfers control of a call from a first cell site to a second cell site. As MS 112 moves from cell 121 to cell 123, MS 112 detects the pilot signal from BS 103 and sends a Pilot Strength Measurement Message to BS 101. When the strength of the pilot transmitted by BS 103 and received and reported by MS 112 exceeds a threshold, BS 101 initiates a soft hand-off process by signaling the target BS 103 that a handoff is required as described in TIA/EIA IS-95 or TIA/EIA IS-2000.

BS 103 and MS 112 proceed to negotiate establishment of a communications link in the CDMA channel. Following establishment of the communications link between BS 103 and MS 112, MS 112 communicates with both BS 101 and BS 103 in a soft handoff mode. Those acquainted with the art will recognize that soft hand-off improves the performance on both forward (BS to MS) channel and reverse (MS to BS) channel links. When the signal from BS 101 falls below a predetermined signal strength threshold, MS 112 may then drop the link with BS 101 and only receive signals from BS 103. The call is thereby seamlessly transferred from BS 101 to BS 103. The above-described soft hand-off assumes the mobile station is in a voice or data call. An idle hand-off is the hand-off between cells sites of a mobile station that is communicating in the control or paging channel.

Any or all of the mobile stations (including fixed wireless terminals) in wireless network 100 may be upgraded by means of an over-the-air (OTA) upgrade procedure that transfers new software to the mobile stations from a remote upgrade server. The remote upgrade server may be accessed via PDSN 150 or MSC 140. In one embodiment of the present invention, the upgrade server may upgrade an existing software file (or target file) in a mobile station by transmitting a new image file that replaces the target file in its entirety. In an alternate embodiment, the remote server may transmit a delta file that is used to replace only selected portions of the target software file, rather than the entire target file. The mobile station executes a software algorithm that reads instructions and data from the delta file. The software algorithm modifies, for example, the existing operating system software to produce a new (or upgraded) version of the operating system software. In this advantageous embodiment, the mobile station downloads a small delta file over the air, rather than a large image file, thereby saving bandwidth.

Figure 2:
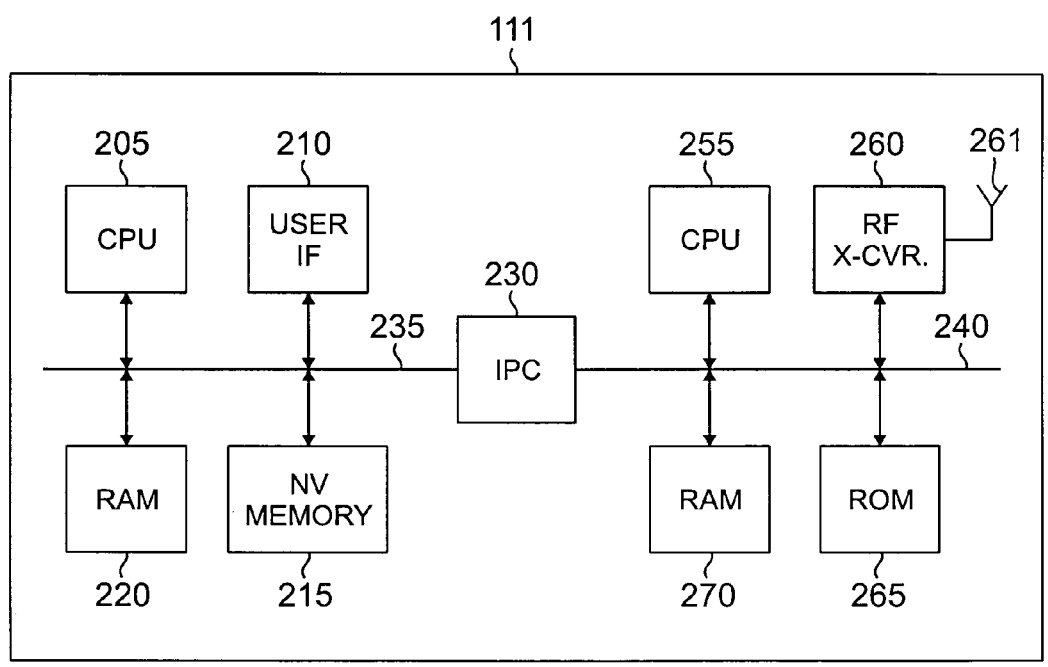
FIG. 2 illustrates an exemplary dual CPU mobile station in greater detail according to one embodiment of the present invention.

FIG. 2 illustrates exemplary dual central processing unit (CPU) mobile station 111 in greater detail according to one embodiment of the present invention. Mobile station 111 comprises central processing unit (CPU) 205, user interface circuitry 210, non-volatile (NV) memory 215, and random access memory (RAM) 220. Mobile station 111 also comprises central processing unit (CPU) 255, radio frequency (RF) transceiver 260, antenna 261, read-only memory (ROM) 265, and random access memory (RAM) 270. Interprocessor communication (IPC) unit 230, bus 235 and bus 240 provide communication between CPU 205 and CPU 255.

In the exemplary embodiment, CPU 255 is the main (or modem) CPU that controls wireless communications via RF transceiver 260. ROM 265 and RAM 270 store programs and data used by main CPU 255. ROM 265 may be a Flash memory or a similar non-volatile memory. CPU 205 is the slave (or multimedia) CPU that executes end-user applications in mobile station 111. Non-volatile (NV) memory 215 and RAM 220 store programs and data used by slave CPU 205. NV memory 215 may be, for example, a Flash memory. IPC unit 230 may comprise any conventional circuit that is capable of transferring data between main CPU 255 and slave CPU 215, including, for example, a shared memory, a dual-port RAM, a FIFO, a serial bus, and the like.

Figure 3:
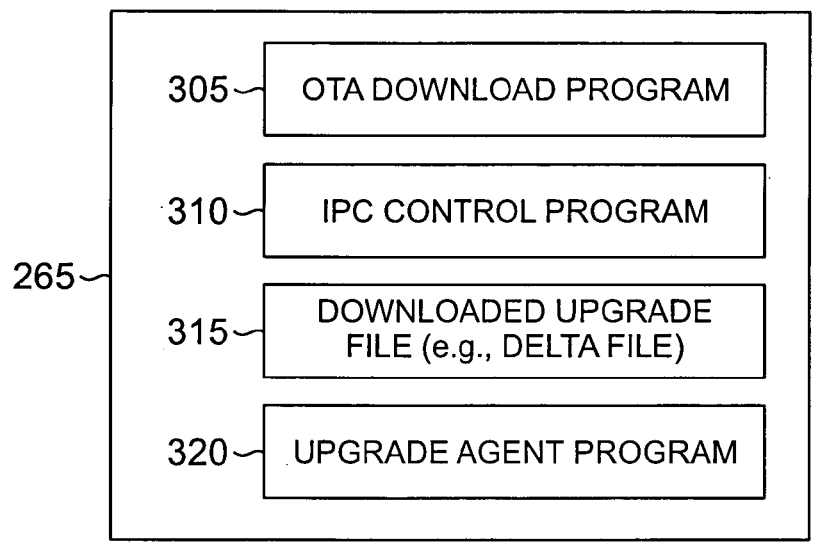
FIG. 3 illustrates selected files in the memory associated with the primary CPU of the exemplary dual CPU mobile station according to one embodiment of the present invention.
Figure 4:
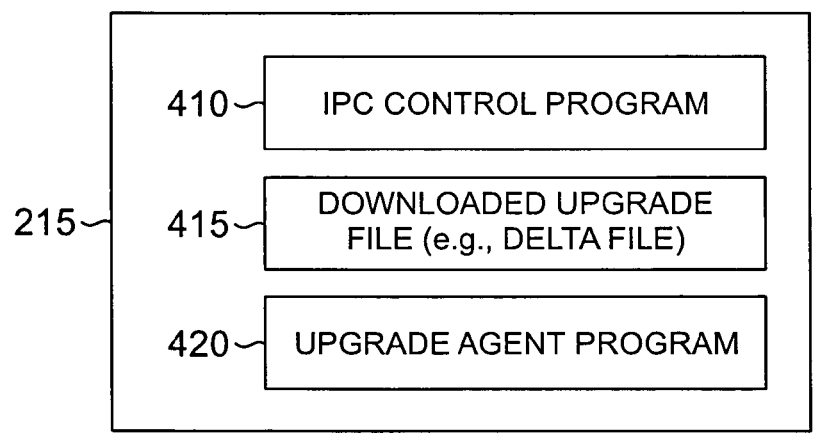
FIG. 4 illustrates selected files in the memory associated with the secondary CPU of the exemplary dual CPU mobile station according to one embodiment of the present invention.

FIG. 3 illustrates selected files in ROM 265 according to one embodiment of the present invention. Among other files, ROM 265 stores over-the-air (OTA) download program 305, IPC control program 310, downloaded upgrade file 315, and upgrade agent program 320. FIG. 4 illustrates selected files in NV memory 215 according to one embodiment of the present invention. Among other files, NV memory 215 stores IPC control program 410, downloaded upgrade file 415 and upgrade agent program 420.

OTA download program 305 is the download control program executed by main CPU 255 in order to retrieve a software upgrade file from the remote server. Main CPU 255 stores the upgrade file (delta file or entire image file) in downloaded upgrade file 315. Main CPU 255 executes IPC control program 310 in order to transfer the upgrade file to slave CPU 205 via IPC unit 230. Slave CPU 205 stores the upgrade file (delta file or entire image file) in downloaded upgrade file 415. Slave CPU 205 executes IPC control program 410 in order to transfer a saved upgrade file to main CPU 255 via IPC unit 230.

Slave CPU 205 hosts all applications (MMI, graphics, etc.) while main CPU 255 executes the bare protocol stack. Thus, slave CPU 205 normally will have larger memory resources (i.e., RAM 220, NV memory 215) than main CPU 255 (e.g., ROM 265, RAM 270). For example, main CPU 255 may use 2 Mb of RAM 270 and 4 Mb of NOR flash memory (ROM 265) for code storage. However, slave CPU 205 may use 16-32 Mb of SDRAM 270 and 32-64 Mb of NAND flash memory 215 (for code, data and file system). Therefore, the most advantageous method for performing OTA operation is for the downloaded software update file to be stored in NV memory 215 of slave CPU 205.

The software code executed by main CPU 255 is distinct from the software code executed by slave CPU 205. Thus, an OTA operation for a dual CPU design may involve a software update for i) main CPU 255 only; ii) slave CPU 205 only; or iii) CPU 215 and CPU 255. Slave CPU 205 executes upgrade agent program 320 in NV memory 215 in order to actually apply the software update file for slave CPU 205. Main CPU 255 executes upgrade agent program 420 in ROM 265 in order to actually apply the software update file for main CPU 255.

Figure 5:
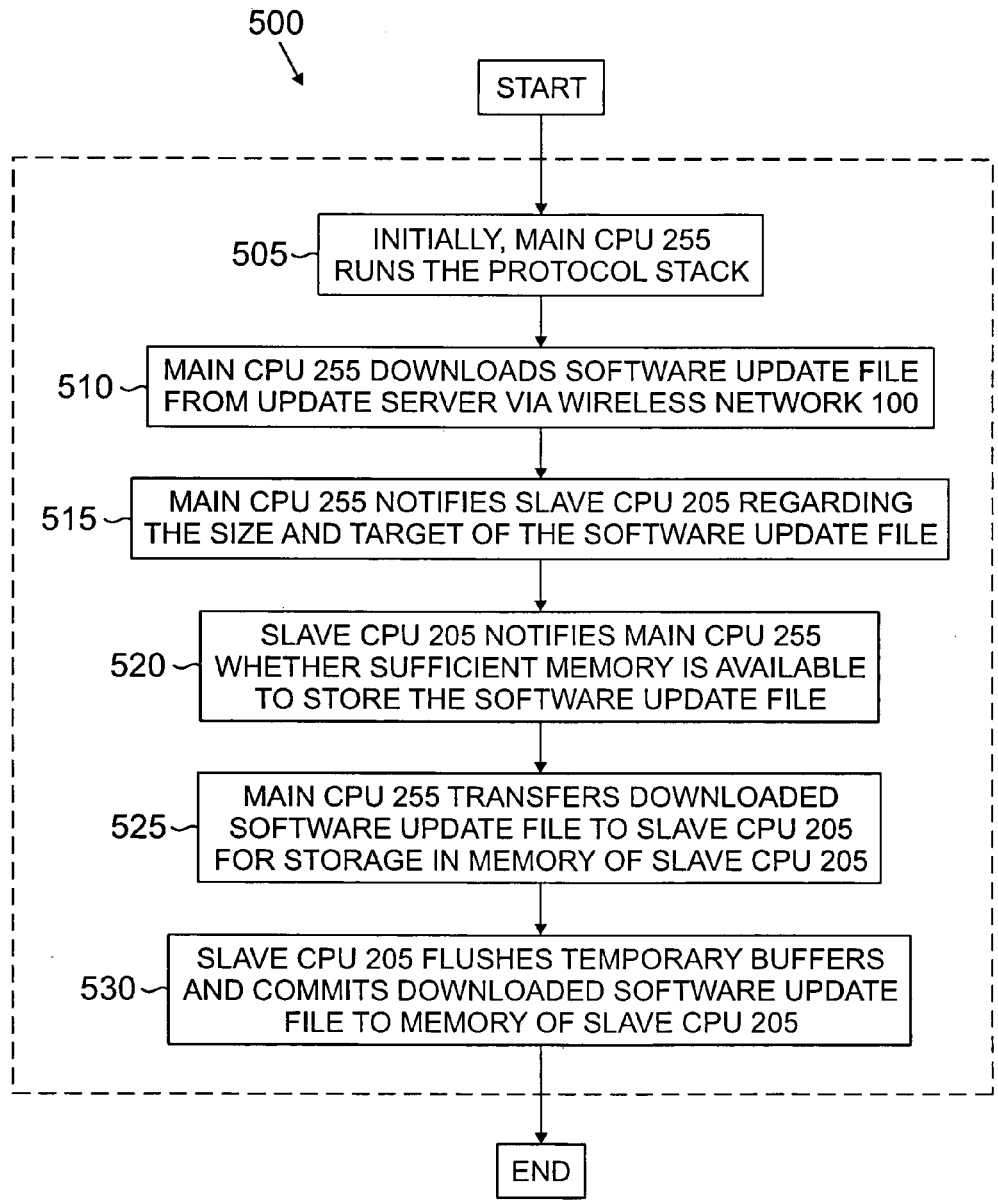
FIG. 5 is a flow diagram illustrating an over-the-air (OTA) software update procedure in the exemplary mobile station according to one embodiment of the present invention.

FIG. 5 depicts flow diagram 500, which illustrates an over-the-air (OTA) software update procedure in the exemplary mobile station according to one embodiment of the present invention. The OTA software update procedure consists of two distinct phases: a download phase and a patch application phase. The download phase retrieves and stores the software upgrade file. After the software upgrade file is stored in the correct memory, the patch application phase applies the software upgrade file.

During routine operation, main CPU 255 runs the protocol stack of choice, such as CDMA, GSM, GPRS, EDGE or the like (process step 505). At some point, main CPU 255 contacts the remote update server (not shown) and downloads the software update file for slave CPU 205 or main CPU 255. In either case, the download procedure is the same (process step 510). As soon as the first packet from the upgrade server is received, main CPU 255 extracts the size of the software update from the message header. For example, if the download protocol is HTTP, the size of the software update is available through the HTTP header Content-Length field. Main CPU 255 then sends the file size value to slave CPU 205 via IPC unit 230. Main CPU 255 also notifies slave CPU 205 whether the target for updating is slave CPU 205 software or main CPU 255 software) (process step 515).

When slave CPU 205 receives the file-size message, slave CPU 205 verifies whether there is sufficient space in the file system in NV memory 215 and/or RAM 220 and sends an appropriate response back to main CPU 255 (process step 520). Depending on the role of the software update, slave CPU 205 creates and reserves downloaded upgrade file 415 in the file system in NV memory 215 for storing the downloaded software. If main CPU 255 receives an "Insufficient Memory" notification message from slave CPU 205, main CPU 255 may abort the OTA upgrade procedure or may prompt the user to delete unwanted files, thus making more memory available.

If main CPU 255 receives a "Memory OK" notification message from slave CPU 205, main CPU 205 sends subsequent downloaded data from wireless network 100 directly to slave CPU 205 205 (via IPC unit 230) to be saved in the memory (file-system) of the slave CPU 205. Slave CPU 205 saves further received packets in the file space of downloaded upgrade file 415 reserved for this purpose (process step 525). When all of the upgrade software is received, main CPU 255 sends an "End" message to slave CPU 205. When slave CPU 205 receives an End message via IPC unit 230, slave CPU 205 flushes all temporary buffers and commits update software file to NV memory 215 (process step 530). Thus, the software update package for either main CPU 255 or slave CPU 205 is stored in NV memory 215 (i.e., file-system) of slave CPU 205.

During application of the software patch, the upgrade agent program needs a small amount of NV memory for bookkeeping purposes and fail-safe recovery. This additional NV memory may be in either main CPU 255 or in slave CPU 205. If such temporary NV memory comes from the other CPU, then an IPC message is used to read/write to such temporary memory.

In an alternate embodiment of the present invention, if main CPU 255 and slave CPU 205 execute the same instruction set (e.g., both are ARM CPUs or both are MIPS CPUs), then one instance of the software update agent program can be used by both CPUs. Assuming that update agent program 320 is stored in the NV memory (i.e., ROM 265) of the main CPU), main CPU 255 executes update agent program 320 and first applies the patch on the code for main CPU 255. Next, CPU 255 transfers update agent program 320 via IPC unit 230 to slave CPU 205. Slave CPU 205 then executes update agent program 320 and applies the software patch on the code for slave CPU 205. It is noted that the common update agent program could have been stored initially on slave CPU 205. In such a case, the procedure would first apply the upgraded software on slave CPU 205, transfer update agent program 420 to main CPU 255, and apply the upgraded software to main CPU 255.

In still another alternative embodiment, if the address space (hardware bus) of one CPU is accessible by the other CPU, it is possible for one CPU to access both NV memories and apply the patch from one place. In fact, the entire address space need not be shared between the two CPUs. Only the relevant NV memory needs to be shared. In such cases, it is advantageous to make the NV memory (i.e., ROM 265) of main CPU 255 accessible to slave CPU 205, so that a single software update agent on slave CPU 205 can do the software patch to the code for both CPUs.

Although the present invention has been described with an exemplary embodiment, various changes and modifications may be suggested to one skilled in the art. It is intended that the present invention encompass such changes and modifications as fall within the scope of the appended claims.

What is claimed is:

1. A dual processor wireless communication device capable of accessing a wireless network and downloading a software upgrade file therefrom, said dual processor wireless communication device comprising:
   a first central processing unit (CPU) configured to operate a protocol stack for controlling wireless communications with said wireless network and downloading the software upgrade file from the wireless network;
   a first memory associated with said first CPU;
   a second central processing unit (CPU) configured to execute at least one end-user application on said dual processor wireless communication device;
   a second memory associated with said second CPU; and
   an interprocessor communication unit (IPC) configured to transfer data between the first CPU and the second CPU of said dual processor wireless communication device,
   wherein upon downloading the software upgrade file from said wireless network, the first CPU is configured to determine a size of the software upgrade file, send the size of the software upgrade file to the second CPU, and upon receiving a verification from the second CPU that the second memory contains sufficient space for the software upgrade file, transfer the downloaded software upgrade file to the second CPU via the IPC for storage in the second memory,
   wherein the software upgrade file is received via a message from the wireless network and the file size of the software upgrade file is extracted from a message header of the message.

2. The dual processor wireless communication device as set forth in claim 1 wherein said first CPU is configured to execute a first upgrade agent program that replaces first existing code associated with a first existing software file in said first memory with first replacement code from said downloaded software upgrade file.

3. The dual processor wireless communication device as set forth in claim 2 wherein said first upgrade agent program is stored in said first memory.

4. The dual processor wireless communication device as set forth in claim 1 wherein said downloaded software upgrade file is associated with a software update for only the first CPU or only the second CPU.

5. The dual processor wireless communication device as set forth in claim 2 wherein said first CPU executes said first upgrade agent program after said downloaded software upgrade file is transferred into said first memory from said second memory.

6. The dual processor wireless communication device as set forth in claim 3 wherein said first upgrade agent program is transferred from said second memory and stored in said first memory.

7. The dual processor wireless communication device as set forth in claim 6 wherein said downloaded software upgrade file and said first upgrade agent program are transferred from said second memory to said first memory by the IPC.

8. The dual processor wireless communication device as set forth in claim 7 wherein said first CPU executes said first upgrade agent program after said downloaded software upgrade file is transferred into said first memory from said second memory.

9. The dual processor wireless communication device as set forth in claim 2 wherein said second CPU is capable of executing a second upgrade agent program that replaces second existing code associated with a second existing software file in said second memory with second replacement code from said downloaded software upgrade file.

10. The dual processor wireless communication device as set forth in claim 9 wherein said second upgrade agent program is stored in said second memory.

11. The dual processor wireless communication device as set forth in claim 10 wherein said second upgrade agent program is transferred from said first memory and stored in said second memory.

12. The dual processor wireless communication device as set forth in claim 11 wherein said second CPU executes said second upgrade agent program after said second upgrade agent program is transferred into said second memory from said first memory.

13. A method of upgrading software in a dual processor wireless communication device comprising: 1) a first CPU that controls wireless communications with the wireless network; 2) a first memory associated with the first CPU; 3) a second CPU that executes at least one end-user application on said dual processor wireless communication device; 4) a second memory associated with the second CPU; and 5) an interprocessor communication unit (IPC), the method of upgrading software comprising:
    operating a protocol stack to access a wireless network using the first CPU;
    downloading the software upgrade file in a message from the wireless network using the first CPU, the message having a message header;
    extracting, upon downloading the software upgrade file, a size of the software upgrade file from the message header using the first CPU;
    sending the size of the software upgrade file to the second CPU using the first CPU;
    verifying that the second memory contains sufficient space for the software upgrade file and sending a verification response to the first CPU using the second CPU; and
    transferring the downloaded software upgrade file from the first CPU to the second CPU via the IPC for storage in the second memory.

14. The method as set forth in claim 13 further comprising executing in the first CPU a first upgrade agent program that replaces first existing code associated with a first existing software file in the first memory with first replacement code from the downloaded software upgrade file.

15. The method as set forth in claim 14 wherein the first upgrade agent program is stored in the first memory.

16. The method as set forth in claim 13, wherein the downloaded software upgrade file is associated with a software update for only the first CPU or only the second CPU.

17. The method as set forth in claim 14 wherein the first CPU executes the first upgrade agent program after the downloaded software upgrade file is transferred into the first memory from the second memory.

18. The method as set forth in claim 15 further comprising transferring the first upgrade agent program from the second memory into the first memory.

19. The method as set forth in claim 18 further comprising transferring the downloaded software upgrade file from the second memory to the first memory.

20. The method as set forth in claim 19 wherein the first CPU executes the first upgrade agent program after the downloaded software upgrade file is transferred into the first memory from the second memory.

21. The method as set forth in claim 14 further comprising executing in the second CPU a second upgrade agent program that replaces second existing code associated with a second existing software file in the second memory with second replacement code from the downloaded software upgrade file.

22. The method as set forth in claim 21 wherein the second upgrade agent program is stored in the second memory.

23. The method as set forth in claim 22 further comprising transferring the second upgrade agent program from the first memory into the second memory.

24. The method as set forth in claim 23 wherein the second CPU executes the second upgrade agent program after the second upgrade agent program is transferred into the second memory from the first memory.

* * * * *